United States Patent
Peters et al.

(10) Patent No.: US 12,103,684 B2
(45) Date of Patent: *Oct. 1, 2024

(54) DRIFT CORRECTION DURING THE APPLICATION OF CROP PROTECTION AGENTS

(71) Applicant: BASF AGRO TRADEMARKS GMBH, Ludwigshafen am Rhein (DE)

(72) Inventors: Ole Peters, Langenfeld (DE); Holger Hoffmann, Langenfeld (DE); Eva Hill, Langenfeld (DE)

(73) Assignee: BASF AGRO TRADEMARKS GMBH, Ludwigshafen am Rhein (DE)

( * ) Notice: Subject to any disclaimer, the term of this patent is extended or adjusted under 35 U.S.C. 154(b) by 0 days.

This patent is subject to a terminal disclaimer.

(21) Appl. No.: 18/123,434

(22) Filed: Mar. 20, 2023

(65) Prior Publication Data
US 2023/0225306 A1    Jul. 20, 2023

Related U.S. Application Data

(63) Continuation of application No. 16/495,853, filed as application No. PCT/EP2018/056822 on Mar. 19, 2018, now Pat. No. 11,608,175.

(30) Foreign Application Priority Data

Mar. 24, 2017    (EP) .................................... 17162863

(51) Int. Cl.
*B64D 1/18*    (2006.01)
*A01M 7/00*    (2006.01)
(Continued)

(52) U.S. Cl.
CPC .............. *B64D 1/18* (2013.01); *A01M 7/0089* (2013.01); *A01M 11/00* (2013.01); *B64C 39/024* (2013.01);
(Continued)

(58) Field of Classification Search
CPC .......... B64D 1/18; B64D 1/16; A01M 7/0089; A01M 11/00; A01M 7/00; A01M 7/0025;
(Continued)

(56) References Cited

U.S. PATENT DOCUMENTS 6,079,340 A    6/2000 Flamme et al.
6,199,000 B1    3/2001 Keller et al.
(Continued)

FOREIGN PATENT DOCUMENTS

CN    204415735 U    6/2015
CN    105292480 A    2/2016
(Continued)

OTHER PUBLICATIONS

International Search Report for PCT/EP2018/056822 mailed on Oct. 1, 2018.
(Continued)

*Primary Examiner* — Abby Y Lin
*Assistant Examiner* — Dylan M Katz
(74) *Attorney, Agent, or Firm* — ArentFox Schiff LLP

(57) ABSTRACT

The present invention relates to the autonomous application of crop protection products by means of a drone. The present invention relates to a process and to an unmanned aerial vehicle for applying crop protection product taking into consideration drift phenomena. The present invention furthermore relates to a computer program product which can be employed for controlling the process according to the invention.

20 Claims, 3 Drawing Sheets

(51) Int. Cl.
*A01M 11/00* (2006.01)
*B64C 39/02* (2023.01)
*B64D 1/16* (2006.01)
*B64U 10/00* (2023.01)
*B64U 101/00* (2023.01)
*B64U 101/40* (2023.01)
*G05D 1/00* (2024.01)

(52) U.S. Cl.
CPC ............. *B64U 10/00* (2023.01); *G05D 1/042* (2013.01); *B64D 1/16* (2013.01); *B64U 2101/00* (2023.01); *B64U 2101/40* (2023.01)

(58) Field of Classification Search
CPC .. B64C 39/024; B64U 10/00; B64U 2101/00; B64U 2101/40; G05D 1/042
See application file for complete search history.

(56) References Cited

U.S. PATENT DOCUMENTS

| | | | |
|---|---|---|---|
| 10,255,670 | B1 | 4/2019 | Wu et al. |
| 11,608,175 | B2 * | 3/2023 | Peters ................... B64C 39/024 |
| 2009/0132132 | A1 | 5/2009 | Peterson et al. |
| 2009/0260272 | A1 | 10/2009 | Donoho |
| 2011/0264307 | A1 * | 10/2011 | Guyette ................. G01S 19/54 701/3 |
| 2014/0303814 | A1 | 10/2014 | Burema et al. |
| 2017/0031365 | A1 * | 2/2017 | Sugumaran ............ B64U 50/19 |
| 2017/0245419 | A1 | 8/2017 | Barbosa et al. |
| 2018/0319499 | A1 * | 11/2018 | Holly ..................... B64C 39/024 |
| 2019/0150357 | A1 * | 5/2019 | Wu ........................ H04N 7/188 |
| 2019/0174739 | A1 | 6/2019 | Peters et al. |
| 2019/0191617 | A1 | 6/2019 | Hoffmann et al. |
| 2019/0208762 | A1 | 7/2019 | Schafer et al. |
| 2019/0357420 | A1 | 11/2019 | Peters et al. |
| 2020/0017215 | A1 | 1/2020 | Wu et al. |

FOREIGN PATENT DOCUMENTS

| | | |
|---|---|---|
| CN | 205018139 U | 2/2016 |
| CN | 105539851 A | 5/2016 |
| CN | 106335641 A | 1/2017 |
| DE | 102006012504 A1 | 9/2007 |
| GB | 2447681 A | 9/2008 |
| JP | 2005-245372 A | 9/2005 |
| WO | WO-0023937 A1 | 4/2000 |
| WO | WO-2015161352 A1 | 10/2015 |
| WO | WO-2016189468 A1 | 12/2016 |

OTHER PUBLICATIONS

Written Opinion of the International Searching Authority for PCT/EP2018/056822 mailed on Oct. 1, 2018.

European Search Report for European Applicaton No. 1716863.9, dated Oct. 5, 2017.

Johnen, A., et al., "The proPlant Decision Support System: Phenological Models for the Major Pests of Oilseed Rape and Their Key Parasitoids in Europe", Biocontrol-Based Integrated Management of Oilseed Rape Pests, Chapter 15, pp. 381-403.

Moran, M.S., et al., "Opportunities and Limitations for Image-Based Remote Sensing in Precision Crop Management", Remote Sensing in Precision Crop Management, pp. 319-346.

Newe, M., et al., "proPlant expert.com—an online consultation system on crop protection in cereals, rape, potatoes and sugarbeet", OEPP/EPPO Bulletin, vol. 33, pp. 443-449.

* cited by examiner

DRIFT CORRECTION DURING THE APPLICATION OF CROP PROTECTION AGENTS

CROSS-REFERENCE TO RELATED APPLICATION(S)

This application is a continuation of U.S. patent application Ser. No. 16/495,853, filed Sep. 20, 2019, which is a national phase entry under 35 U.S.C. § 371 of International Application No. PCT/EP2018/056822, filed Mar. 19, 2018, which claims the benefit of priority of European Patent Application No. 17162863.9, filed Mar. 24, 2017, the disclosures of which are hereby incorporated by reference herein in their entireties.

BACKGROUND

The present invention relates to the autonomous application of crop protection products by means of a drone. The present invention relates to a process and to an unmanned aerial vehicle for applying crop protection product taking into consideration drift phenomena. The present invention furthermore relates to a computer program product which can be employed for controlling the process according to the invention.

Automation has long been used in the field of agriculture. Autonomous agricultural machinery carries out field operations; autonomous aerial vehicle (drones) investigate field conditions and apply crop protection products (see, for example, US2014303814A1, WO2015/161352A2).

When employing drones for the application of a crop protection product, there is the risk that the crop protection product is distributed unevenly as the result of wind. An uneven distribution is disadvantageous since not enough crop protection product can mean an insufficient effect and/or lead to the development of resistances against the crop protection product employed. An unduly high application of crop protection product, in contrast, can cause damage or infringe legal or regulatory requirements. It is conceivable that there are protected zones within a field or adjacent to a field, which zones must not come into contact with crop protection product. Wind means the risk that crop protection product reaches such zones when applied by means of a drone.

DETAILED DESCRIPTION

Figure 1:
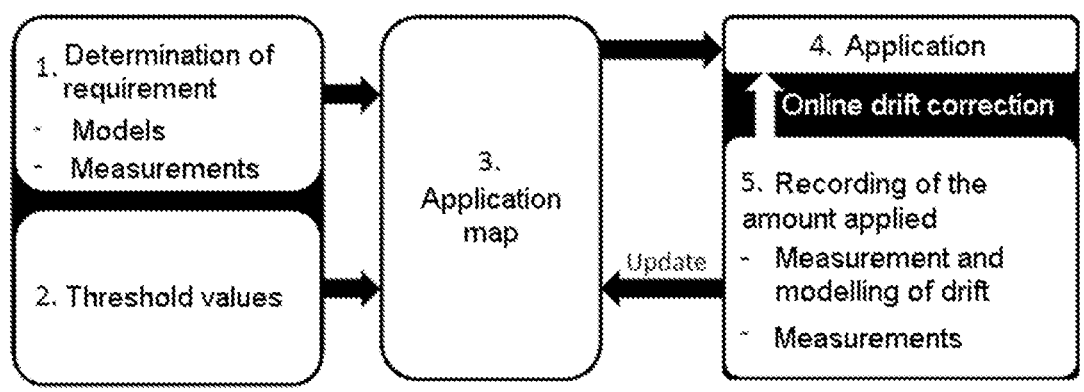
FIG. 1 schematically shows a preferred flow for applying crop protection product to a field.

The subject matters of the embodiments described herein address these problems.

A first subject matter of the present invention is therefore a process for applying a crop protection product to a field by means of an autonomous aerial vehicle (drone), comprising the steps:

providing a digital application map for the field in which the amounts of crop protection product to be applied are recorded for individual partial areas of the field passing over the field by the autonomous aerial vehicle along a route, and applying the crop protection product via at least one nozzle determining the spatial distribution of the crop protection product during the application adapting the parameters for applying the crop protection product to the spatial distribution determined, so that the crop protection product is applied to the partial areas of the field in accordance with the digital application map.

A further subject matter of the present invention is an unmanned aerial vehicle for applying a crop protection product to a field on which crop plants are grown, comprising:

a tank for the crop protection product at least one nozzle for applying the crop protection product above the field conveying means for conveying a crop protection product from the tank towards the at least one nozzle a storage unit for storing a digital application map in which the amounts of crop protection product to be applied are recorded for individual partial areas of the field a control unit which is configured such that it manoeuvres the aerial vehicle along a route above the field and, in doing so, prompts the conveying means to apply crop protection product to the field via the at least one nozzle according to the digital application map while the unmanned aerial vehicle passes over the field;

wherein the control unit, during the application of the crop protection product, receives information on the spatial distribution of the crop protection product applied and adapts application parameters when the spatial distribution results in the deviation of the amounts applied from the data of the digital application map.

Another subject matter of the present invention is a computer program product comprising a storage medium and program code which is stored on the storage medium, and a computer or a control unit into whose main memory the program code is loaded, which causes the following steps to be carried out:

reading in a digital application map in which the amounts of crop protection product to be applied are recorded for individual partial areas of a field controlling a drone for applying the crop protection product on the field according to the digital application map determining drift during the application of the crop protection product adapting the application parameters and/or flight parameters (flying speed and height) and/or route such that drift is reduced or minimized.

The invention is illustrated hereinbelow in greater detail without making any distinction between the individual subject matters of the invention (process, drone, computer program product). Rather, what will be said hereinbelow shall apply analogously to all subject matters of the invention, irrespective of in which context (process, drone, computer program product) they occur.

In a first step of the process according to the invention, a digital application map is provided for a field in which crop plants are grown or intended to be grown.

The term "field" is understood as meaning a spatially delimitable area of the Earth's surface which is preferably used agriculturally by crop plants being grown, provided with nutrients and harvested on such a field. An individual variety of a crop plant may be grown in one field; however, it is also possible for various varieties of a crop plant and/or for various crop plants to be grown. It is also conceivable that a field comprises an area or several areas in which no crop plants are being grown and/or are intended to be grown.

The term "crop plant" is understood as meaning a plant which is grown, as the result of human intervention, in a targeted manner as crop or ornamental plant.

A digital application map is a digital representation of the field or of a part of the field. The application map states the partial areas of the field to which amounts of one or more selected crop protection product(s) are to be applied, for example so as to prevent the spreading of harmful organisms and/or to control harmful organisms.

The term "digital" means that the image can be processed by a machine, as a rule a computer system. "Processing" is understood as meaning the known electronic data processing (EDP) processes.

The term "crop protection product" is understood as a product whose purpose it is to protect plants or plant products from harmful organisms or to prevent their effect, to destroy undesired plants or plant parts, to inhibit undesired plant growth or to prevent such a growth, and/or to influence plants' life processes in a manner other than nutrients (for example growth regulators).

Examples of crop protection products are herbicides, fungicides and pesticides (for example insecticides).

A crop protection product usually comprises an active substance or a plurality of active substances. "Active substances" refer to substances which have a specific effect on an organism and which cause a specific reaction. Usually, a crop protection product comprises a carrier for diluting the one or more active substances. Besides, additives such as preservatives, buffers, colorants and the like are conceivable. A crop protection product may be in solid, liquid or gaseous form.

Growth regulators serve for example to increase lodging resistance in cereals by shortening culm length (culm shorteners or, better, internode shorteners), improving the rooting of nursery plants, reducing plant height by stunting in horticulture, or preventing the germination of potatoes. They are usually phytohormones or their synthetic analogues.

A "harmful organism" or "pest" for short is understood as meaning an organism which is capable of appearing when crop plants are grown and of damaging the crop plant, of adversely affecting the harvest of the crop plant or of competing with the crop plant for natural resources. Examples of such harmful organisms are broad-leaved weeds, grass weeds, animal pests such as, for example, beetles, caterpillars and worms, fungi and pathogens (for example bacteria and viruses). Although viruses are, biologically speaking, not organisms, they shall nevertheless be included in the present context under the term harmful organism.

The term "broad-leaved weed" (plural: weeds) is understood as meaning plants of the spontaneously occurring accompanying vegetation in stands of crop plants, on grassland or in gardens, which are not deliberately grown in those settings and which develop for example from the soil seed potential or are air-borne. The term is not limited to herbs in the strict sense, but also comprises grasses, ferns, mosses or woody plants.

A term which is also frequently used in the field of crop protection is "grass weed" (plural: grass weeds) so as to make a distinction from herbaceous plants. In the present text, the term weed is used as a generic term which is intended to encompass grass weeds, unless reference is made to specific broad-leaved weeds or grass weeds.

Grass weeds and broad-leaved weeds for the purposes of the present invention are plants which accompany a desired crop plant when it is grown. Since they compete with the crop plant for resources, they are undesired and should therefore be controlled.

In principle, it is also feasible to use the present invention for the application of one or more nutrients to a field, too.

The term "nutrients" is understood to mean those inorganic and organic compounds from which plants can take up the elements from which their bodies are made. Frequently, these elements themselves are also referred to as nutrients. Depending on the plant's location, the nutrients are taken from the air, the water and the soil. They are, in most cases, simple inorganic compounds such as water ($H_2O$) and carbon dioxide ($CO_2$) and ions such as nitrate ($NO_3^-$), phosphate ($PO_4^{3-}$) and potassium ($K^+$). The availability of the nutrients differs. It depends on the chemical behaviour of the nutrient and on the location's conditions. Since the nutrient elements are required in a specific weight ratio, it is in most cases the availability of one element that limits plant growth. If this element is provided, growth is enhanced. Others which are vital besides the core elements of organic matter (C, O, H, N and P) are K, S, Ca, Mg, Mo, Cu, Zn, Fe, B, Mn, Cl in higher plants, Co, Ni. Nitrogen, for example, may be supplied as nitrate, ammonium or amino acid. In some cases, $Na^+$ acts as a functional replacement for $K^+$.

Methods for the generation of digital application maps are described for example in GB2447681A, U.S. Pat. No. 6,199,000, US 2009/0132132A1 and WO00/23937.

To generate a digital application map, it is customary to first determine a requirement of treatment of the field or of such areas of the field with a crop protection product.

The requirement of a treatment may for example be the result of the fact that pest attack has occurred or threatens to occur. For example, it is conceivable that the weeds in the field must be removed before the seed of a crop plant is sown. It is also conceivable that, after sowing, weeds have developed in the field and must be removed. It is also conceivable that some of the crop plants grown, or all of the crop plants grown, are infected with a pathogen or a fungus. It is also conceivable that an animal pest has spread in the field. It is also feasible that the spreading of a pest attack is imminent.

The requirement is preferably determined by employing sensors in and/or above the field. Suitable sensors are, for example, remote sensors. Remote sensors generate digital images of areas of the soil surface from which information on the vegetation and/or environmental conditions prevailing there may be obtained (see, for example, M. S. Moran et al.: Opportunities and Limitations for Image-Based Remote Sensing in Precision Crop Management, Remote Sensing of Environment (1997) 61: 319-346).

The data of these sensors (remote sensing data) are obtained via the interfaces provided by the supplier and may comprise electromagnetic data sets from various processing steps.

Instead of, or as supplement to, remote sensing data, information on determining the requirement may also be obtained by means of sensors in the field. Examples which may be mentioned are LiDAR sensors for determining flying pests or sensors which provide information on differences regarding growth stages/conditions (for example N-sensor from Yara or GreenSeeker from Trimble).

For determining a requirement it is also conceivable to employ predictive models, for example for predicting a pest attack. Such predictive models are extensively described in the prior art and also commercially available. The decision support system proPlant Expert uses data on the culture being grown (developmental stage, growth conditions, crop protection measures), on the weather conditions (temperature, insolation, wind speed, precipitation) and of the known pests/diseases (economic thresholds, pest/disease pressure) for the prediction and, based on these data, calculates a risk of an attack (Newe M., Meier H., Johnen A., Volk T.: *proPlant expert.com—an online consultation system on crop protection in cereals, rape, potatoes and sugarbeet.* EPPO Bulletin 2003, 33, 443-449; Johnen A., Williams I. H., Nilsson C., Klukowski Z., Luik A., Ulber B.: *The proPlant Decision Support System: Phenological Models for the Major Pests of Oilseed Rape and Their Key Parasitoids in Europe*, Biocontrol-Based Integrated Management of Oilseed Rape Pests (2010) Ed.: Ingrid H. Williams. Tartu 51014, Estonia. ISBN 978-90-481-3982-8. p. 381-403; www.proPlantexpert.com).

The requirement is preferably determined in a partial area-specific manner. Usually, the requirement of the treatment with a crop protection product is not uniform across a field, but varies. A pest attack usually initially occurs at one or more sites from where it spreads. Thus, as a rule, some partial areas within a field will require a greater treatment with a crop protection product, while other areas have a lower requirement or may have no requirement at all.

After the requirement has been determined, preferably in a partial area-specific manner, the amount of crop protection product required will usually be determined.

The amount required may, for example, depend on the severity of an attack by harmful organisms. It is conceivable that a treatment with crop protection product is only planned for those partial areas where a damage threshold is exceeded. Furthermore, it is conceivable that the amount required depends on the growth stage of the plant to be treated.

However, it is also feasible that there are protected zones in a field or adjacent to a field, in which zones no crop protection product should be applied.

When determining the requirement, legal and/or regulatory limits are therefore preferably taken into consideration. Furthermore, there may exist not only maximal amounts which may be applied, but also minimal amounts which should be applied so as for example to avoid resistances.

When determining the amounts required, amounts of crop protection products which have already been applied in the past can also be taken into consideration.

It is also conceivable to roughly determine the amounts required before starting the application of crop protection product, and, while passing over the field by means of sensor(s) on the drone, to determine the actual area-specific amounts required (refinement).

It is furthermore conceivable only to determine the amounts required by means of sensor(s) on the drone while passing over the field.

Once the amounts required have been determined, a digital application map is generated in which the amounts of crop protection product to be applied are recorded in a partial area-specific manner in accordance with the amounts required that have been determined. This digital application map is herein also referred to as the "original application map". It is conceivable to adapt the original application map to local circumstances while a crop protection product is being applied.

The digital application map can be uploaded into a digital data storage of an unmanned aerial vehicle. An unmanned aerial vehicle (UAV) is an aerial vehicle which, without an on-board crew, is capable of being operated and navigated independently by a computer or from the ground via a remote control. In the present description, the terms "autonomous aerial vehicle" and "drone" are used synonymously with the term "unmanned aerial vehicle". Preferably, the drone according to the invention is controlled and navigated independently by an on-board computer. To this end, the drone according to the invention includes a positioning system, preferably a satellite-supported positioning system. The Global Positioning System (GPS), officially known as NAVSTAR GPS, is an example of a global navigation satellite system for positioning purposes.

Furthermore, the drone according to the invention includes a tank for receiving a crop protection product, at least one nozzle and means for conveying a crop protection product from the tank towards the at least one nozzle. The crop protection product is applied, i.e. above the field, via the at least one nozzle.

The drone according to the invention passes over the field. The respective position of the drone is recorded by means of a positioning system. Furthermore, the amount of crop protection product which corresponds with the respective position is determined by means of the digital application map. The respective amount is released via a control unit.

It may be the case that, while the drone passes over the field and releases crop protection product via the at least one nozzle, the crop protection product does not reach the ground where intended according to the original digital application map. It may be the case that, as the result of wind, at least some of the crop protection product has dispersed to other areas.

The term "drift" is understood as meaning all those effects which lead to crop protection product, which is released via at least one nozzle, does not reach the ground where intended. In a preferred embodiment wind is the cause for drift.

The term "driftage" is understood as meaning the proportion of the applied amount of crop protection product which, during application, does not reach the ground where intended as per the original digital application map.

In accordance with the invention, the spatial distribution of the crop protection product is determined while the drone passes over the field and while the crop protection product is being applied.

For example, it is conceivable that one or more wind sensors on the drone and/or in the field measure the wind speed and wind direction. It is calculated with reference to a model of how the crop protection product which is released via the at least one nozzle becomes distributed spatially as the result of the wind and gravity while falling, and which amounts are applied to the field in a partial area-specific manner (amount per unit area).

It is feasible that (instead or in addition to one or more wind sensors) quantity sensors are present in the field which collect a part of the crop protection product released by the drone and determine the partial-area-specific amount. Preferably, these quantity sensors communicate with the drone so that they can, for example, determine the drone's position. If the drone's position during the application is known, the spatial distribution of the crop protection product during the application may be calculated from the area-specific amount in the field.

It is preferred to generate a digital distribution map while the drone passes over the field and while crop protection product is being applied, which digital distribution map records the specific amounts of crop protection product which have reached the ground in the individual areas. While the original application map represents the projected status, the digital distribution map represents, in a manner of speaking, the actual status. The difference between projected status (original digital application map) and actual status (digital distribution map) is caused by drift.

In order to approach the projected status, application parameters are adapted to fit the prevailing drift.

In a preferred embodiment, the driftage is recorded, and the original application map is updated to match the driftage. As the result of drift, amounts of the crop protection product have reached the ground in partial areas which, according to the current route of the drone, should not (yet) be sprayed with crop protection product. However, it is conceivable that, according to the actual route, they are intended to be sprayed at a later point in time. Since, however, a certain amount of crop protection product has reached the ground in these partial areas (the driftage amount) the amount yet to be applied will be reduced accordingly. This means that, in the (original) application map, the respective driftage amount is subtracted from the amount to be applied at the respective partial areas. When the drone later passes over the respective partial area, a correspondingly lesser amount of crop protection product will be applied. Conversely, however, in some partial areas, as a result of drift phenomena, a lesser amount of crop protection product than provided for by the original application map will reach the ground. Measures are therefore taken to compensate for this shortfall, for example by adapting the application parameters during the application of crop protection product and/or by changing the route.

Preferably, the digital application map is constantly updated during the application process.

Furthermore, other application parameters may be adapted to the prevailing drift. For example, it is conceivable that the route of the drone is adapted. If the original route passes in close proximity to a protected zone where no application shall take place, and if a strong wind is registered during the application and, consequently, there is the risk of crop protection product reaching the protected zone as a result of the drift, then the route can be adapted so that crop protection product can no longer reach the protected zone. The distance of the route from the protected zone may be extended. Furthermore, the height of the drone may be reduced.

Further application parameters which may be adapted to the prevailing drift are, for example, the number of nozzles via which crop protection product is released, the nozzle position, the pressure before the at least one nozzle, the flying speed of the drone, the flying height and others.

The drone according to the invention includes a control unit which has various purposes. It is conceivable that, instead of a single control unit, a plurality of control units are present to which the individual purposes are assigned. For the sake of simplicity, only one control unit is mentioned herein.

One purpose of the control unit is to manoeuvre the drone along the predetermined route. The route may be recorded in the digital application map; however, it is also conceivable that the route is created independently of the digital application map and loaded separately into a memory of the drone. It is also conceivable that the drone is remotely controlled, i.e. that it is connected to a stationary control unit which monitors the respective position of the drone and instructs the drone in respect of the direction in which the drone should move.

A further purpose of the control unit is to release crop protection product as per the digital application map. To this end, the digital application map is uploaded into a working memory of the control unit. The control unit records the position of the drone above the field and determines the amount of crop protection product to be released at the respective position as per the digital application map. The control unit causes the conveying means to convey the corresponding amount of crop protection product towards the nozzle. The crop protection product leaves the drone via the nozzle and reaches the field.

The control unit may also be used to determine the drift. For example, it is conceivable that the drone comprises one or more wind sensors which measure the speed and also the direction of the prevailing wind and transmit the data to the control unit. It is also conceivable that the control unit receives the information on the prevailing wind from external stationary wind sensors. The control unit may include a model which is capable of calculating the spatial distribution of the crop protection product, which is released via the at least one nozzle, under varying application and drift parameters. However, it is also conceivable that such a model is implemented on an external stationary computer which communicates with the control unit of the drone.

With reference to the actual application and drift parameters, the model determines the spatial distribution of the crop protection product, which is released via the at least one nozzle. Furthermore, the distribution of the crop protection product on the field is calculated. This information can then enter into a digital distribution map.

Using the model, it is also preferably possible to calculate how the application parameters must be adapted so as to compensate for the effects caused by drift.

The changed application parameters are then applied correspondingly by the control unit, for example for controlling the drone, the conveying means and/or the nozzle, so as to arrive at the status provided in the original digital application map (projected status).

FIG. 1 schematically shows a preferred flow for applying crop protection product to a field by means of a drone. Individual features mentioned in the figure or described with reference to the figure are not limited to the figure shown, but may be combined as desired with other features of the present description.

(1) The preferably partial-area-specific requirement of a field of the treatment with crop protection product is determined. To this end, it is possible to employ models such as, for example, plant growth models and/or predictive models for the attack of a harmful organism. As an alternative or in addition thereto, it is possible to carry out measurements such as, for example, measurements with sensors which indicate for example an attack of a harmful organism, measurements which provide information on the existing growth stage of the vegetation prevailing in the field, and/or measurements of environmental conditions (soil moisture, weather and the like) which provide information on an imminent attack of a harmful organism.

(2) Threshold values enter into the determination of the amount required. There may be upper threshold values, for example because there is a maximal amount of crop protection product which may be applied. There may be lower threshold values, for example a minimum amount of crop protection product which should be applied to prevent resistances.

(3) The required amounts determined enter into the generation of a (original) digital application map. The application map shows which amounts of crop protection product are to be applied to individual partial areas of the field.

(4) Crop protection product is applied as per the application map, i.e. a drone passes over the field and applies that amount of crop protection product which is recorded in the digital application map for the respective position at the positions at which it is respectively located.

(5) While the crop protection product is being applied, the amount applied in each case is recorded. Moreover, it is determined how the amount applied is distributed spatially during the application. From the spatial distribution it is determined which amounts of the crop protection product reach the ground at which positions of the field. The determinations are based firstly on measurements, in particular of wind speed and wind direction, which are responsible for drift phenomena, and secondly on the modelling of the spatial distribution of the crop protection product which is released by the at least one nozzle of the drone. Besides wind speed and wind direction, the application parameters (such as, for example, amount applied per unit of time, nozzle position, number of nozzles, pressure before the nozzle) as well as flying height and flying speed of the drone may enter into the modelling. However, it is also conceivable that sensors in the field are employed, which collect some of the amounts of crop protection product applied as they reach the ground in the field.

The amount of crop protection product which reach the ground in the field and which are determined by modelling and/or measurements by means of sensors are compared with the amounts recorded in the digital application map. In the case of a deviation caused by drift, the digital application map may be adapted for example by recording the amounts which as the result of drift have already reached the ground in partial areas although they should not yet have reached the ground in the partial areas as per the actual route in the application map (update). Furthermore, it is conceivable to adapt the application parameters such that the further application of crop protection product takes place to match the application map (online drift correction).

Figure 2:
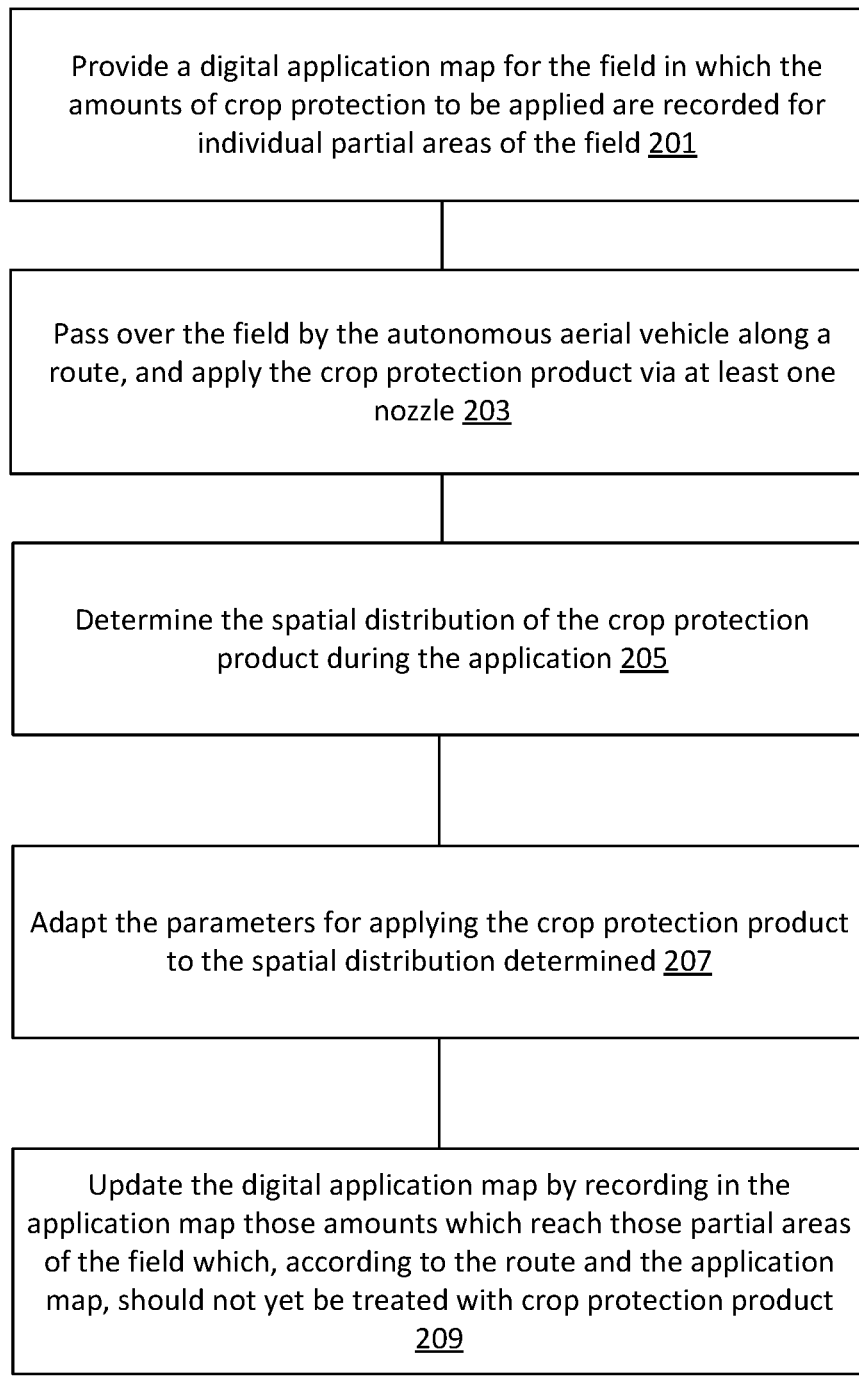
FIG. 2 is a block diagram illustrating an example method for applying crop protection product to a field.

FIG. 2 is a flow diagram of an example process for applying a crop protection product to a field by means of an autonomous aerial vehicle (i.e., drone).

In some embodiments, the process includes, at operation 201, providing a digital application map for the application. In some embodiments, the amounts of crop protection product to be applied are recorded for the application map for individual partial areas of the field.

At operation 203, the process includes passing over the field by the autonomous aerial vehicle along a route, and applying the crop protection product via at least one nozzle.

At operation 205, the process includes determining the spatial distribution of the crop protection product during the application.

At operation 207, the process includes adapting the crop protection product to the spatial distribution determined, so that the crop protection product is applied to the partial areas of the field in accordance with the digital application field.

At operation 209, the process includes updating the digital application map. In some embodiments, updating the digital application map includes recording in the application map those amounts which reach those partial areas of the field which, according to the route and the application map, should not yet be treated with crop protection product.

Figure 3:
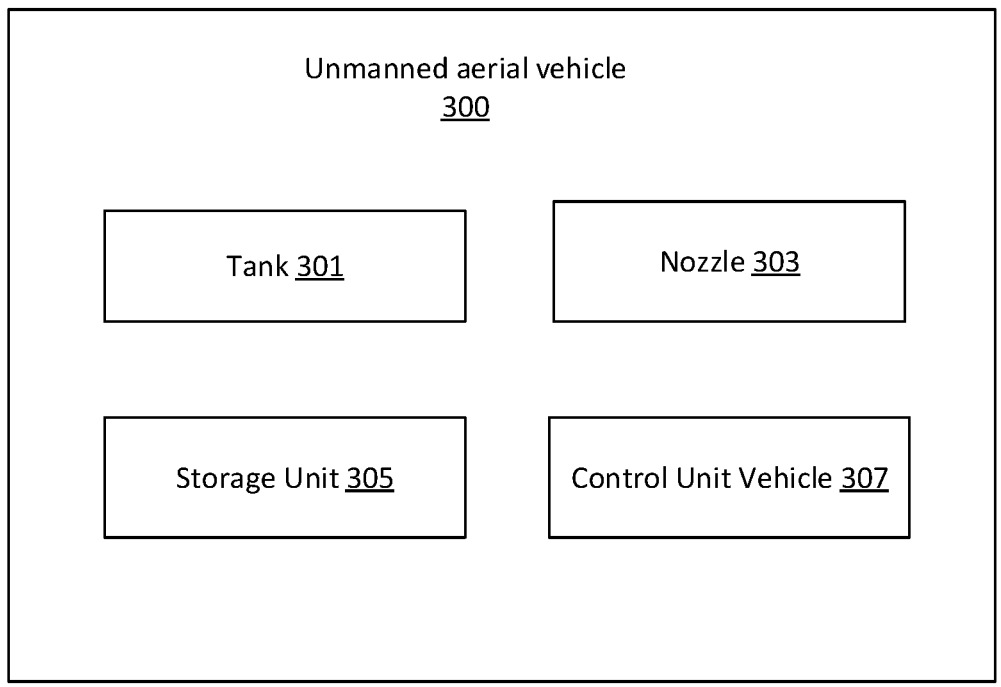
FIG. 3 is a block diagram illustrating an unmanned aerial vehicle (e.g., drone) for applying a crop protection product to a field on which crop plants are grown.

FIG. 3 is a block diagram illustrating an unmanned aerial vehicle 300 (e.g., drone) for applying a crop protection product to a field on which crop plants are grown.

In some embodiments, the unmanned aerial vehicle 300 includes a tank 301 for the crop protection product. The unmanned aerial vehicle 300 can include at least one nozzle 303 for applying the crop protection product above the field.

In some embodiments, the crop protection product is to be conveyed from the tank 301 towards the at least one nozzle 303.

In some embodiments, the unmanned aerial vehicle 300 includes a storage unit 305. The storage unit 305 can store a digital application map in which the amounts of crop protection product to be applied are recorded for individual partial areas of the field.

In some embodiments, the unmanned aerial vehicle 300 includes a control unit vehicle 307. The control unit vehicle 307 can be configured such that it maneuvers the unmanned aerial vehicle 300 along a route above the field. In doing so, the control unit vehicle 307 can prompt the application of the crop protection product to the field via the at least one nozzle 303 according to the digital application map while the unmanned aerial vehicle 300 passes over the field. In some embodiments, the digital application map is updating during the application by recording in the application map those amounts which reach those partial areas of the field which, according to the route and the application map, should not yet be treated with crop protection product. In some embodiments, the control unit vehicle 307 receives information, during the application of the crop protection product, on the spatial distribution of the crop protection product applied. The control unit vehicle 307 can adapt application parameters when the spatial distribution results in the deviation of the amounts applied from the data of the digital application map.

The invention claimed is:

1. A method of applying a crop protection product to a field using an autonomous aerial vehicle, the method comprising:
   providing a digital application map for the field comprising indications of amounts of the crop protection product to be applied for individual partial areas of the field;
   causing the autonomous aerial vehicle to pass over the field along a route and apply the crop protection product via at least one nozzle;
   determining, based on a plurality of parameters measured during the application of the crop protection product, amounts of the crop protection product that reach partial areas of the field that, according to the route and/or the digital application map, should not and/or not yet be treated with crop protection product, and wherein the plurality of parameters comprises at least: the spatial distribution of the crop protection product, a plurality of wind parameters, and a plurality of application parameters; and
   computing or updating drift parameters to compensate for drift phenomena, wherein the drift parameters are computed or updated such that, during further application, no amounts of the crop protection product reach the partial areas that, according to the digital application map, should not and/or not yet be treated with the crop protection product, and wherein the computing or updating is based on the determined amounts of the crop protection product that reach the partial areas of the field that, according to the route and/or the digital application map, should not and/or not yet be treated with crop protection product.

2. The method of claim 1, further comprising:
   determining the spatial distribution of the crop protection product during the application; and
   computing or adapting one or more application parameters for applying the crop protection product according to the determined spatial distribution such that the crop protection product is applied to the partial areas of the field in accordance with the digital application map.

3. The method of claim 1, wherein the digital application map is updated during the application by recording amounts that reach the partial areas of the field which, according to the route and the application map, should not yet be treated with crop protection product are recorded in the digital application map.

4. The method of claim 1, wherein the wind speed and the wind direction prevailing during the application is recorded by one or more wind sensors, and wherein the method further comprises:
determining amounts of crop protection product that, as the result of the wind, reach partial areas of the fields that, according to the route and/or the digital application map, should not or not yet be treated with crop protection product.

5. The method of claim 1, wherein a part of the amounts of crop protection product applied in the field is collected by one or more sensors, and wherein the method further comprises:
identifying, with the aid of the collected crop protection product, the amounts which reach those partial areas of the field which, according to the route and/or the digital application map, should not or not yet be treated with crop protection product.

6. The method of claim 1, further comprising:
calculating, using a model: one or more amounts of crop protection product which are applied per unit of time, number of nozzles used, nozzle positions, pressure before the nozzles, flying height of the drone, flying speed of the drone, wind speed, or wind direction.

7. The method of claim 1, wherein, during the application, the digital application map is compared with a digital distribution map and one or more application parameters, the route, or flying height and flying speed of the autonomous aerial vehicle are adapted such that the digital distribution map corresponds to the digital application map.

8. An unmanned aerial vehicle for applying a crop protection product to a field on which crop plants are grown, comprising:

a tank to store the crop protection product;

at least one nozzle to convey the crop protection product from the tank and apply the crop protection product to the field;

a storage unit for storing a digital application map in which amounts of crop protection product to be applied are recorded for individual partial areas of the field; and a control unit configured to maneuver the aerial vehicle along a route above the field and apply the crop protection product to the field via the at least one nozzle according to the digital application map while the unmanned aerial vehicle passes over the field, wherein the control unit is configured to determine, based on a plurality of parameters measured during the application of the crop protection product, amounts of the crop protection product that reach partial areas of the field that, according to the route and/or the digital application map, should not and/or not yet be treated with crop protection product, and wherein the plurality of parameters comprises at least: the spatial distribution of the crop protection product, a plurality of wind parameters, and a plurality of application parameters, wherein the control unit is configured to compute or update drift parameters to compensate for drift phenomena, wherein the drift parameters are computed or updated such that, during application, no amounts of the crop protection product reach the partial areas that, according to the digital application map, should not and/or not yet be treated with the crop protection product, and wherein the computing or updating is based on the determined amounts of the crop protection product that reach the partial areas of the field that, according to the route and/or the digital application map, should not and/or not yet be treated with crop protection product.

9. The unmanned aerial vehicle of claim 8, wherein the control unit is further configured to:

determine the spatial distribution of the crop protection product during the application; and compute or adapt one or more application parameters for applying the crop protection product according to the determined spatial distribution such that the crop protection product is applied to the partial areas of the field in accordance with the digital application map.

10. The unmanned aerial vehicle of claim 8, wherein the digital application map is updated during the application by recording amounts that reach the partial areas of the field which, according to the route and the application map, should not yet be treated with crop protection product are recorded in the digital application map.

11. The unmanned aerial vehicle of claim 8, wherein the wind speed and the wind direction prevailing during the application is recorded by one or more wind sensors, and wherein the control unit is further configured to:

determine amounts of crop protection product that, as the result of the wind, reach partial areas of the fields that, according to the route and/or the digital application map, should not or not yet be treated with crop protection product.

12. The unmanned aerial vehicle of claim 8, wherein a part of the amounts of crop protection product applied in the field is collected by one or more sensors, and wherein the control unit is further configured to:

identify, with the aid of the collected crop protection product, the amounts which reach those partial areas of the field which, according to the route and/or the digital application map, should not or not yet be treated with crop protection product.

13. The unmanned aerial vehicle of claim 8, wherein the control unit is further configured to:

calculate, using a model: one or more amounts of crop protection product which are applied per unit of time, number of nozzles used, nozzle positions, pressure before the nozzles, flying height of the drone, flying speed of the drone, wind speed, or wind direction.

14. The unmanned aerial vehicle of claim 8, wherein the control unit is further configured to:

the digital application map is compared, during the application, with a digital distribution map and one or more application parameters, the route, or flying height and flying speed of the autonomous aerial vehicle are adapted such that the digital distribution map corresponds to the digital application map.

15. A non-transitory computer-readable medium comprising instructions encoded thereon that, when executed by a control unit, cause the control unit to:

provide a digital application map for a field comprising indications of amounts of a crop protection product to be applied for individual partial areas of the field;

cause the autonomous aerial vehicle to pass over the field along a route and apply the crop protection product via at least one nozzle;

determine, based on a plurality of parameters measured during the application of the crop protection product, amounts of the crop protection product that reach partial areas of the field that, according to the route and/or the digital application map, should not and/or not yet be treated with crop protection product, and wherein the plurality of parameters comprises at least: the spatial distribution of the crop protection product, a plurality of wind parameters, and a plurality of application parameters; and compute or update drift parameters to compensate for drift phenomena, wherein the drift parameters are computed or updated such that, during further application, no amounts of the crop protection product reach the partial areas that, according to the digital application map, should not and/or not yet be treated with the crop protection product, and wherein the computing or updating is based on the determined amounts of the crop protection product that reach the partial areas of the field that, according to the route and/or the digital application map, should not and/or not yet be treated with crop protection product.

16. The non-transitory computer-readable medium of claim 15, wherein the instructions further cause the control unit to:

determine the spatial distribution of the crop protection product during the application; and compute or adapt one or more application parameters for applying the crop protection product according to the determined spatial distribution such that the crop protection product is applied to the partial areas of the field in accordance with the digital application map.

17. The non-transitory computer-readable medium of claim 15, wherein the digital application map is updated during the application by recording amounts that reach the partial areas of the field which, according to the route and the application map, should not yet be treated with crop protection product are recorded in the digital application map.

18. The non-transitory computer-readable medium of claim 15, wherein the wind speed and the wind direction prevailing during the application is recorded by one or more wind sensors, and wherein the instructions further cause the control unit to:

determine amounts of crop protection product that, as the result of the wind, reach partial areas of the field that, according to the route and/or the digital application map, should not or not yet be treated with crop protection product.

19. The non-transitory computer-readable medium of claim 15, wherein a part of the amounts of crop protection product applied in the field is collected by one or more sensors, and wherein the instructions further cause the control unit to:

identify, with the aid of the collected crop protection product, the amounts which reach those partial areas of the field which, according to the route and/or the digital application map, should not or not yet be treated with crop protection product.

20. The non-transitory computer-readable medium of claim 15, wherein, during the application, the digital application map is compared with a digital distribution map and one or more application parameters, the route, or flying height and flying speed of the autonomous aerial vehicle are adapted such that the digital distribution map corresponds to the digital application map.

* * * * *